United States Patent [19]

Kanatani

[11] 4,237,456

[45] Dec. 2, 1980

[54] DRIVE SYSTEM FOR A THIN-FILM EL DISPLAY PANEL

[75] Inventor: Yoshiharu Kanatani, Tenri, Japan

[73] Assignee: Sharp Kabushiki Kaisha, Osaka, Japan

[21] Appl. No.: 819,147

[22] Filed: Jul. 26, 1977

[30] Foreign Application Priority Data

| | | | |
|---|---|---|---|
| Jul. 30, 1976 | [JP] | Japan | 51-92571 |
| Feb. 10, 1977 | [JP] | Japan | 52-13630 |
| Feb. 10, 1977 | [JP] | Japan | 52-13631 |
| Feb. 10, 1977 | [JP] | Japan | 52-13632 |
| Feb. 14, 1977 | [JP] | Japan | 52-15429 |

[51] Int. Cl.[3] .......... G06F 3/14

[52] U.S. Cl. .......... 340/719; 340/166 EL; 340/781

[58] Field of Search ....... 340/166 EL, 324 R, 324 M, 340/781, 718, 719, 760

[56] References Cited

U.S. PATENT DOCUMENTS

| | | | |
|---|---|---|---|
| 2,947,912 | 8/1960 | Hoffman et al. | 340/166 EL |
| 3,142,819 | 7/1964 | Duinker et al. | 340/166 EL |
| 3,300,581 | 1/1967 | Steinmeyer | 340/166 EL |
| 3,885,196 | 5/1975 | Fischer | 340/781 |
| 3,904,924 | 9/1975 | Hilsom et al. | 340/166 EL |
| 3,922,668 | 11/1975 | Kishimoto et al. | 340/166 EL |
| 3,973,136 | 8/1976 | Lee | 340/166 EL |
| 4,006,383 | 2/1977 | Luo et al. | 340/166 EL |
| 4,042,854 | 8/1977 | Luo et al. | 340/166 EL |

*Primary Examiner*—Marshall M. Curtis

*Attorney, Agent, or Firm*—Birch, Stewart, Kolasch & Birch

[57] ABSTRACT

A drive system is provided for a thin-film EL display panel which includes an EL thin layer sandwiched between a pair of dielectric layers, a plurality of scanning line electrodes formed on one of the dielectric layers, and a plurality of data line electrodes formed on the other of the dielectric layers. The scanning line electrodes and the data line electrodes, in combination, define a matrix pattern. A selected data line is preliminarily charged to a predetermined level below the threshold level of electroluminescence. Thereafter, a selected scanning line is connected to receive a write-in pulse, of which the level is also below the threshold level of electroluminescence. A picture point at which the selected data line and the selected scanning line cross each other receives a voltage of the preliminary charge superimposed on the write-in pulse and having a value exceeding the threshold level, thereby providing electroluminescence.

12 Claims, 8 Drawing Figures

DRIVE SYSTEM FOR A THIN-FILM EL DISPLAY PANEL

BACKGROUND OF THE INVENTION

The present invention relates to a drive system for a thin-film EL matrix display panel, which includes an EL thin layer sandwiched between a pair of dielectric layers.

A thin-film EL element can stably provide electroluminescence of high brightness. Therefore, a flat matrix display has been developed, wherein a plurality of data line electrodes and a plurality of scanning line electrodes are formed on a pair of dielectric layers, between which an EL thin layer is sandwiched, in a matrix fashion. A desired data line and a desired scanning line are connected to receive high voltages so as to provide the electroluminescence at a picture point where the selected data line and scanning line cross each other, whereby a desired symbol or picture is displayed in a dot matrix fashion.

The thin-film EL element requires a considerably high voltage of about 150 through 300 V to provide electroluminescence. In conventional drive systems, two kinds of high voltage switching elements are employed for connecting one group of electrodes to a high voltage source, and for connecting the other group of electrodes to a grounded terminal, respectively. That is, two kinds of switching elements, namely, NPN transistors and PNP transistors, or N-channel MOS transistors and P-channel MOS transistors are required. It is very difficult to form two different kinds of switching elements on a single substrate and, therefore, the conventional drive system is not suited for integrated circuit techniques.

OBJECTS AND SUMMARY OF THE INVENTION

Accordingly, an object of the present invention is to provide a novel drive system for a thin-film EL matrix display panel.

Another object of the present invention is to provide a drive system for a thin-film EL matrix display panel, wherein switching elements for applying a predetermined voltage to a selected picture point in the matrix panel are made of one kind of switching element.

Still another object of the present invention is to construct a driver circuit for a thin-film EL matrix display panel through the use of integrated circuit techniques.

Yet another object of the present invention is to enhance the brightness of a selected picture point in a thin-film EL matrix display panel.

A further object of the present invention is to stabilize write-in operation in a drive system for a thin-film EL matrix display panel.

A still further object of the present invention is to minimize influence caused by suspended capacity of scanning lines included within a thin-film EL matrix display panel.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, scanning line electrodes and data line electrodes are formed respectively on a pair of dielectric layers sandwiching an EL thin layer in order to define a matrix pattern. A scanning line switching circuit is connected to the scanning line electrodes, and a data line switching circuit is connected to the data line electrodes. The scanning line switching circuit and the data line switching circuit comprises one kind of semiconductor switching element.

A selected data line is preliminarily charged to a predetermined level below the threshold level of electroluminescence through the scanning line switching circuit and the data line switching circuit. Thereafter, a selected scanning line is connected to receive a write-in pulse, of which the level is also below the threshold level of electroluminescence, through the scanning line switching circuit and the data line switching circuit. A picture point at which the selected data line and the selected scanning line cross each other receives a voltage of the preliminary charge superimposed on the write-in pulse and having a value exceeding the threshold level, thereby providing electroluminescence.

In a preferred form, a refresh pulse is applied to all picture points included within the thin-film EL display panel through the scanning line switching circuit and the data line switching circuit after completion of the scanning of one field. The selected picture point again provides electroluminescence upon receiving the refresh pulse of which a polarity is opposite to that of the write-in pulse.

In another preferred form, suspended capacity of the scanning line electrodes is preliminarily charged to a predetermined level below the threshold level of electroluminescence in order to minimize influence caused by the suspended capacity of the scanning line electrodes.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
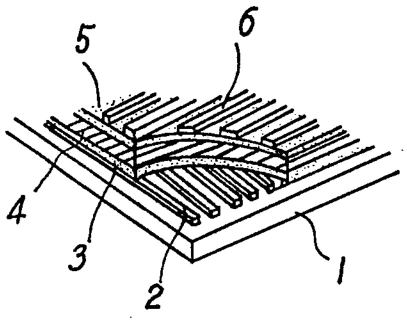
FIG. 1 is a perspective view showing a typical construction of a thin-film EL matrix display panel.

Referring now in detail to the drawings, and to facilitate a more complete understanding of the present invention, a typical construction of a thin-film EL matrix display panel will be first described with reference to FIG. 1.

A plurality of transparent, parallel line electrodes 2 made of $In_2O_3$ are formed on a glass substrate 1. A dielectric film 3 made of, for example, $Y_2O_3$ or $Si_3N_4$ is formed on the transparent, parallel line electrodes 2 and the glass substrate 1, and upon which an electroluminscent layer 4 made of a ZnS thin-film doped with manganese is formed. Another dielectric film 5 made of, for example, $Y_2O_3$ or $Si_3N_4$ is formed on the electroluminescent layer 4. These dielectric films 3 and 5, and the electroluminescent layer 4 are formed through the use of evaporation techniques or a spattering method to the thickness of 500–10,000 Å. A plurality of counter, parallel line electrodes 6 made of $Al_2O_3$ are formed on the dielectric layer 5 in such a manner that the electrodes 2 and 6 cross each other at right angle.

With such an arrangement, a matrix drive can be achieved by applying selection signals to the electrodes 2 and 6. A picture point where the selected electrodes 2 and 6 cross each other provides electroluminscence.

Figure 2:
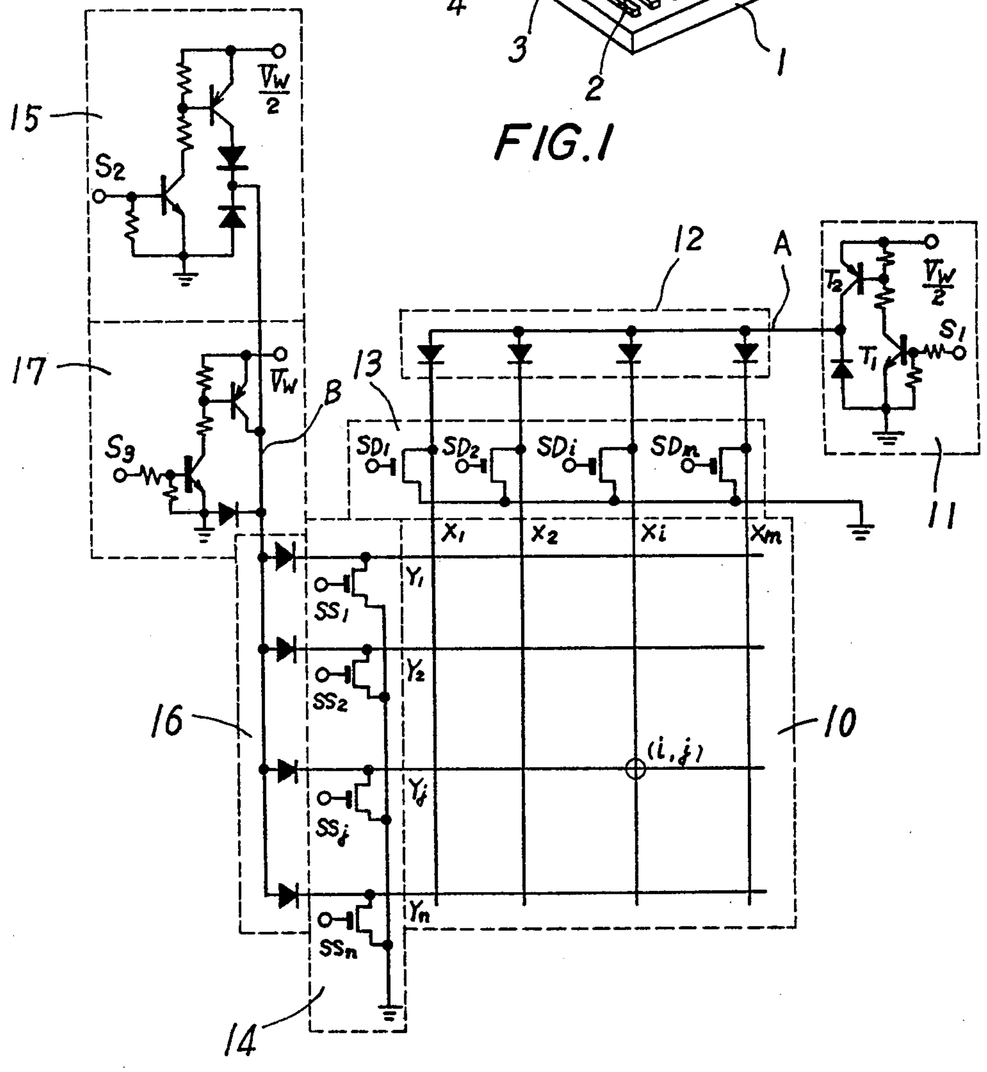
FIG. 2 is a circuit diagram of an embodiment of a drive system of the present invention.
Figure 3:
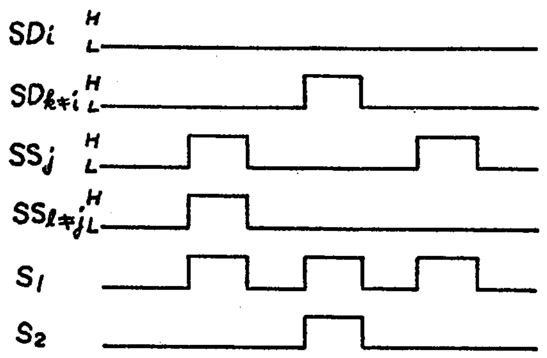
FIG. 3 is a time chart showing various signals occurring within the drive system of FIG. 2.

FIG. 2 shows an embodiment of a drive system of the present invention. FIG. 3 shows various signals occurring within the drive system of FIG. 2.

The drive system of FIG. 2 mainly comprises a thin-film EL matrix display panel 10 as shown in FIG. 1, a drive source 11, a data side diode array 12, a data side switching circuit 13, a scanning side switching circuit 14, another drive source 15, a scanning side diode array 16, and a field refresh source 17.

The thin-film EL matrix display panel 10 includes data line electrodes $X_1$ through $X_m$, and scanning line electrodes $Y_1$ through $Y_n$. The drive source 11 functions to apply a selection voltage $\frac{1}{2}V_w$, which is a half level of the threshold of electroluminescence, to a common line A. The data side diode array 12 functions to separate data side drive lines, and to protect the data side switching circuit 13 from being biased backward. The data side switching circuit 13 comprises high voltage N-channel MOS transistors $SD_1$ through $SD_m$ of which the source electrodes are connected in common. The data side switching circuit 13 functions to discharge electric charges charged at non-selected picture points.

The scanning side switching circuit 14 comprises high voltage N-channel MOS transistors $SS_1$ through $SS_n$ of which the source electrodes are connected in common. The scanning side switching circuit 14 functions to apply a write-in voltage to a selected picture point. The drive source 15 functions to apply a scanning voltage $\frac{1}{2}V_w$, which is a half of the threshold level of electroluminescence, to a common line B. The scanning side diode array 16 functions to separate scanning side drive lines, and to protect the scanning side switching circuit 14 from being biased backward. The field refresh source 17 functions to provide the common line B with a field refresh pulse upon completion of one field scanning in order to supply all picture points of the thin-film EL matrix display panel 10 with the field refresh pulse.

The write-in operation is as follows:

At the first stage, high level signals are applied to the MOS transistors $SS_1$ through $SS_n$ included within the scanning side switching circuit 14 to thereby render them conductive. At this moment, the MOS transistors $SD_1$ through $SD_m$ included within the data side switching circuit 13 are maintained OFF. When a control signal is applied to an input terminal $S_1$ of the drive source 11 to conduct transistors $T_1$ and $T_2$ included within the drive source 11, the selection voltage $\frac{1}{2}V_w$ is developed to the common line A. Therefore, all picture points of the thin-film EL matrix display panel 10 are charged to the selection voltage level of $\frac{1}{2}V_w$ through the data line electrodes $X_1$ through $X_m$.

Since the above-mentioned thin-film EL matrix display panel includes the dielectric films 3 and 5 sandwiching the electroluminscent layer 4, and electrodes 2 and 6 formed on the dielectric films 3 and 5, the thin-film EL matrix display panel can be considered as a capacitive element. That is, the above-mentioned voltage $\frac{1}{2}V_w$ is charged at the respective capacitor components of the picture points.

At the second stage, the MOS transistor $SD_i$ connected to the data line electrode $X_i$, which includes a picture point (i, j) to be written-in, is maintained OFF, and the MOS transistors $SD_{k\neq i}$ connected to the non-selected data line electrodes $X_{k\neq i}$ are turned ON. At the same time, all MOS transistors $SS_1$ through $SS_n$ connected to the scanning line electrodes $Y_1$ through $Y_n$ are turned OFF. When the control signal is applied to the input terminal $S_1$, the voltage $\frac{1}{2}V_w$ is applied to the common line A. At this moment, another control signal is applied to an input terminal $S_2$ included within the drive source 15 to develop the voltage $\frac{1}{2}V_w$ to the common line B.

With this operation, the data line electrode $X_i$ associated with the selected picture point (i, j) maintains the voltage $\frac{1}{2}V_w$, whereas the charges stored on the non-selected data lines $X_{k\neq i}$ are discharged through the MOS transistors $SD_{k\neq i}$. Since the voltage $\frac{1}{2}V_w$ is applied to the common line B and the all transistors $SS_1$ through $SS_n$ connected respectively to the all scanning line electrodes $Y_1$ through $Y_n$ are OFF, the voltage $\frac{1}{2}V_w$ is charged to drive wire capacity $C_s$ of the non-selected scanning line electrodes $Y_{l\neq j}$.

At the third stage, the transistors $SD_1$ through $SD_m$ included within the data side switching circuit 13 are OFF, and the transistor $SS_j$ of the scanning side switching circuit 14 connected to the selected scanning line electrode $Y_j$ is ON. The control signal is again applied to the input terminal $S_1$ of the drive source 11 to conduct the transistors $T_1$ and $T_2$, whereby the voltage $\frac{1}{2}V_w$ is applied to the common line A. Since the picture point (i, j) is previously charged to the scanning voltage level $\frac{1}{2}V_w$, the voltage level of $\frac{1}{2}V_w$ applied at the third stage via the data electrodes is superimposed on the preliminary selection voltage.

The non-selected data lines $X_{k\neq i}$ are maintained at the voltage level of $\frac{1}{2}V_w$ which is applied at the third stage, since the voltage charged at the first stage is discharged at the second stage. The non-selected scanning lines $Y_{l\neq j}$ are pulled up to the third stage voltage $\frac{1}{2}V_w$ because of the capacity coupling.

Accordingly, the selected picture point (i, j) receives the write-in voltage $V_w$ and provides electroluminescence. Half-selected picture points (i, l) where the selected data line $X_i$ and the non-selected scanning lines $Y_{l\neq j}$ cross each other, and half-selected picture points (k, j) where the non-selected data lines $X_{K\neq i}$ and the selected scanning line $Y_j$ cross each other receive the voltage of $\frac{1}{2}V_w$ but do not provide electroluminescence because the voltage level $\frac{1}{2}V_w$ is below the threshold level of the thin-film EL element. Non-selected picture points (k, l) where the non-selected data lines and the non-selected scanning lines cross each other do not provide electroluminescence at all.

Figure 4:
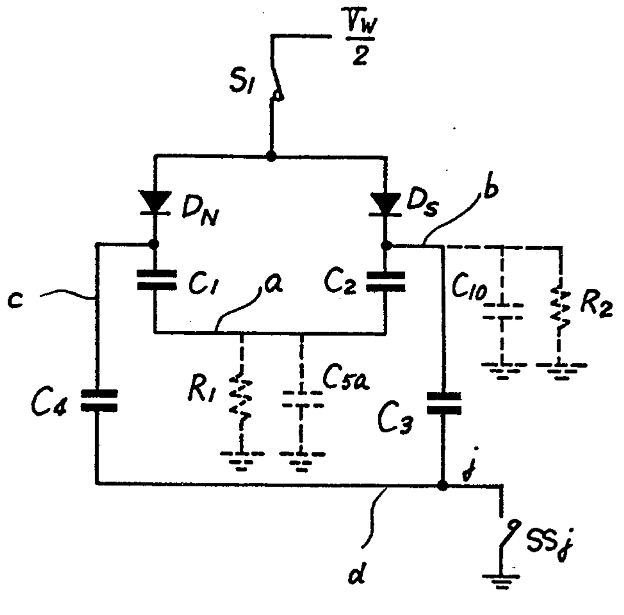
FIG. 4 is an equivalent circuit diagram of one operation mode of the drive system of FIG. 2.

FIG. 4 shows an equivalent circuit of the above discussed drive system at a moment before the third stage write-in operation is conducted. That is, FIG. 4 is an equivalent circuit of the condition where the transistor $SS_j$ connected to the selected scanning line $Y_j$ is ON, and the transistors $SS_{l \neq j}$ are OFF. More specifically, FIG. 4 shows a condition immediately before the voltage $\frac{1}{2} V_w$ is applied to the common line A.

In respect to FIG. 4, each symbol has the following meaning:

m: number of data lines of the matrix panel n: number of scanning lines of the matrix panel m, n>>1

Ce: capacity of one picture point j: selected scanning line p: number of selected data lines to be written-in $C_s$: suspended capacity of wiring of the scanning side $C_d$: suspended capacity of wiring of the data side $D_s$: whole diodes connected to data lines including picture points to be written-in (biased backward)

$D_n$: whole diodes connected to data lines not including picture points to be written-in (biased forward)

$C_1$: total capacity of non-selected picture points (k, l) where non-selected data line and non-selected scanning line cross each other;

$$C_1=(n-1)(m-p)C_e$$

$C_2$: total capacity of half-selected picture points (i, l) where selected data line and non-selected scanning line cross each other;

$$C_2=p\,(n-1)C_e$$

$C_3$: total capacity of selected picture point (i, j);

$$C_3=pC_e$$

$C_4$: total capacity of half-selected picture points (k, j) where selected scanning line and non-selected data line cross each other;

$$C_4=(m-p)C_e$$

$C_5$: sum of suspended capacity of wiring of scanning side;

$$C_5=(n-1)C_s$$

$C_6$: sum of suspended capacity of data side wiring including selected picture point (i, j);

$$C_6=pC_d$$

$R_1$: total OFF impedance of all scanning side switching elements;

$$R_1=nR_o$$

where: $R_o$ is OFF impedance of one switching element $R_2$: total OFF impedance of selected data line switching element;

$$R_2=pR_o$$

$C_{10}$: sum of suspended capacity of selected data line;

$$C_{10}=pC_d$$

A point a assumes the voltage level $\frac{1}{2} V_w$, a point b assumes the voltage level $V_w$, and points c and d bear the voltage level $\frac{1}{2} V_w$.

In the condition where the transistor $SS_j$ of the selected scanning line $Y_j$ is ON, the remaining transistors $SS_{l \neq j}$ are OFF, all of the data side transistors $SD_1$ through $SD_m$ are OFF, and the voltage $\frac{1}{2} V_w$ is applied to the common line A at the third stage, the point a assumes a voltage $V_s$ calculated as follows:

$$V_s = \frac{1}{1+\frac{C_5}{C_1}} \times \tfrac{1}{2} V_w$$

And the point b bears a voltage $V_d$, which is derived from the doctrine of conservation of energy.

$$\tfrac{1}{2}C_2(V_w/2)^2=\tfrac{1}{2}(C_2+C_3+C_6)(V_d-V_s)^2 \quad (1)$$

Therefore, $$V_d = \sqrt{\frac{1}{1+\frac{C_3}{C_2}+\frac{C_6}{C_2}}} \times \frac{V_w}{2} + V_s \quad (2)$$

Now assume that:

$$(m-p)\,C_e >> C_s \quad (3)$$

$$(n-1)\,C_e >> C_d \quad (4)$$

The following can be derived from the equations (1) and (2), since $C_1>>C_5$, and $C_2>>C_3$, $C_6$.

$$V_s \doteqdot V_w/2, \quad \text{and} \quad V_d=V_w \quad (5)$$

It will be clear from the foregoing that the write-in voltage $V_w$ is applied to all the picture points $C_3$ to be written-in, the half-selected voltage $V_w/2$ is applied to all the half-selected picture points $C_2$ and $C_4$, and no voltage is applied to all the non-selected picture points as long as conditions (3) and (4) are satisified. That is, the write-in operation is effected only to the selected picture point.

The limitation (3) is eliminated in the above-mentioned drive system because the suspended capacity $C_s$ of the scanning line is preliminarily charged in advance of the application of the write-in voltage at the third stage. Therefore, a predetermined write-in voltage $V_w$ is applied to all of the selected picture points even when the number of the selected picture points is very large.

In this way, the write-in operation of one scanning line is completed. The write-in operation is progressively conducted to successive scanning lines. At a successive write-in operation the charge current does not flow to the data line previously written-in because the previously written data line stores the write-in voltage. The preliminary charge current flows only to the data line not previously written-in.

When the write-in operation of one field is completed, the field refresh pulse is applied from the field refresh source 17 via the scanning side diode array 16. At this moment, the transistors $SS_1$ through $SS_n$ of the scanning side switching circuit 14 are OFF, and the transistors $SD_1$ through $SD_m$ of the data side switching circuit 13 are OFF. The field refresh pulse has the voltage level $V_w$ and is applied to the thin-film EL matrix display panel 10 in the counter direction to that of the write-in voltage. Accordingly, the thin-film EL matrix display panel is driven on an alternating voltage drive basis through the use of the write-in voltage and the field refresh pulse.

When the field refresh pulse is applied to the thin-film EL matrix display panel, the written picture points provide electroluminescence since the picture point being previously supplied with the write-in voltage is polarized and the field refresh pulse is superimposed on the electric field created by the polarization. The field refresh pulse functions to eliminate the inclination of the polarization and, therefore, the picture point can provide electroluminescence when the write-in voltage is applied in a suceeding field.

In the above-mentioned embodiment, the suspended capacity $C_s$ of the scanning side drive wiring is charged to the scanning voltage $\frac{1}{2}V_w$ at the second stage, and the thus charged voltage $\frac{1}{2}V_w$ of the suspended capacity $C_s$ is utilized to apply the write-in voltage $V_w$ to the selected picture point at the third stage. However, the thus charged voltage is discharged during the transition period from the second stage to the third stage. The discharge circuit includes the OFF impedance of the switching elements of the scanning side switching circuit 14. The time constant $t_o$ of the discharge circuit is as follows:

$$t_o=R_oC_s$$

Accordingly, a time period T provided between the second stage and the third stage must be very short as compared with the above-mentioned time period $t_o$. For example, the following condition must be satisfied:

$$T<<2.2\ R_oC_s$$

In a typical circuit, $R_o=10$ MΩ, $C_s=10$ μF and $T<10$ μsec and, therefore, the above-mentioned condition is satisfied.

Figure 5:
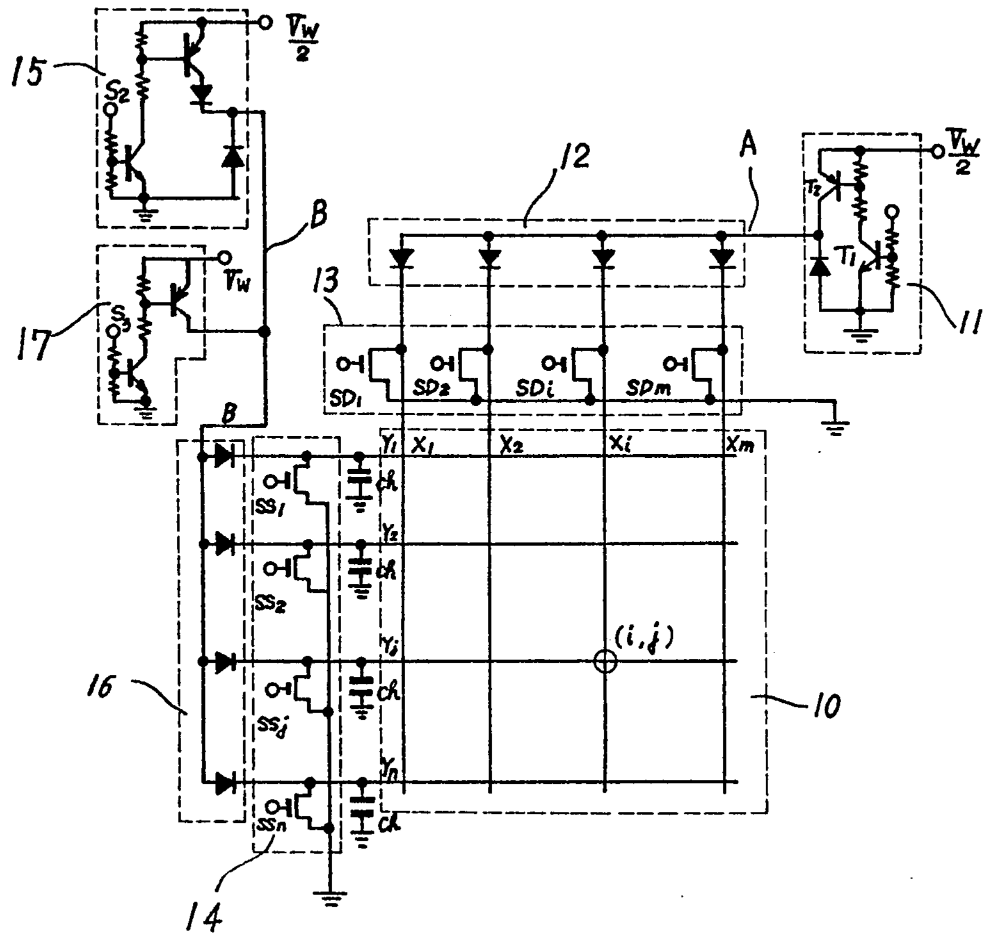
FIG. 5 is a circuit diagram of another embodiment of a drive system of the present invention.

FIG. 5 shows another embodiment of the drive system of the present invention, which can eliminate the above-mentioned problems. Like elements corresponding to those of FIG. 2 are indicated by like numerals.

Capacitors $C_h$ are connected to each of the scanning line electrodes $Y_1$ through $Y_n$ or the lead wires thereof. With such an arrangement, the capacitors $C_h$ are charged at the second stage in addition to the charge operation conducted to the suspended capacity $C_s$ of the scanning lines $Y_1$ through $Y_n$. Therefore, the time constant $t_{ol}$ is as follows:

$$t_{ol}=R_o\,(C_s+C_{ol})$$

Accordingly, the time period T is considerably short as compared with the lengthened time constant $t_{ol}$.

Figure 6:
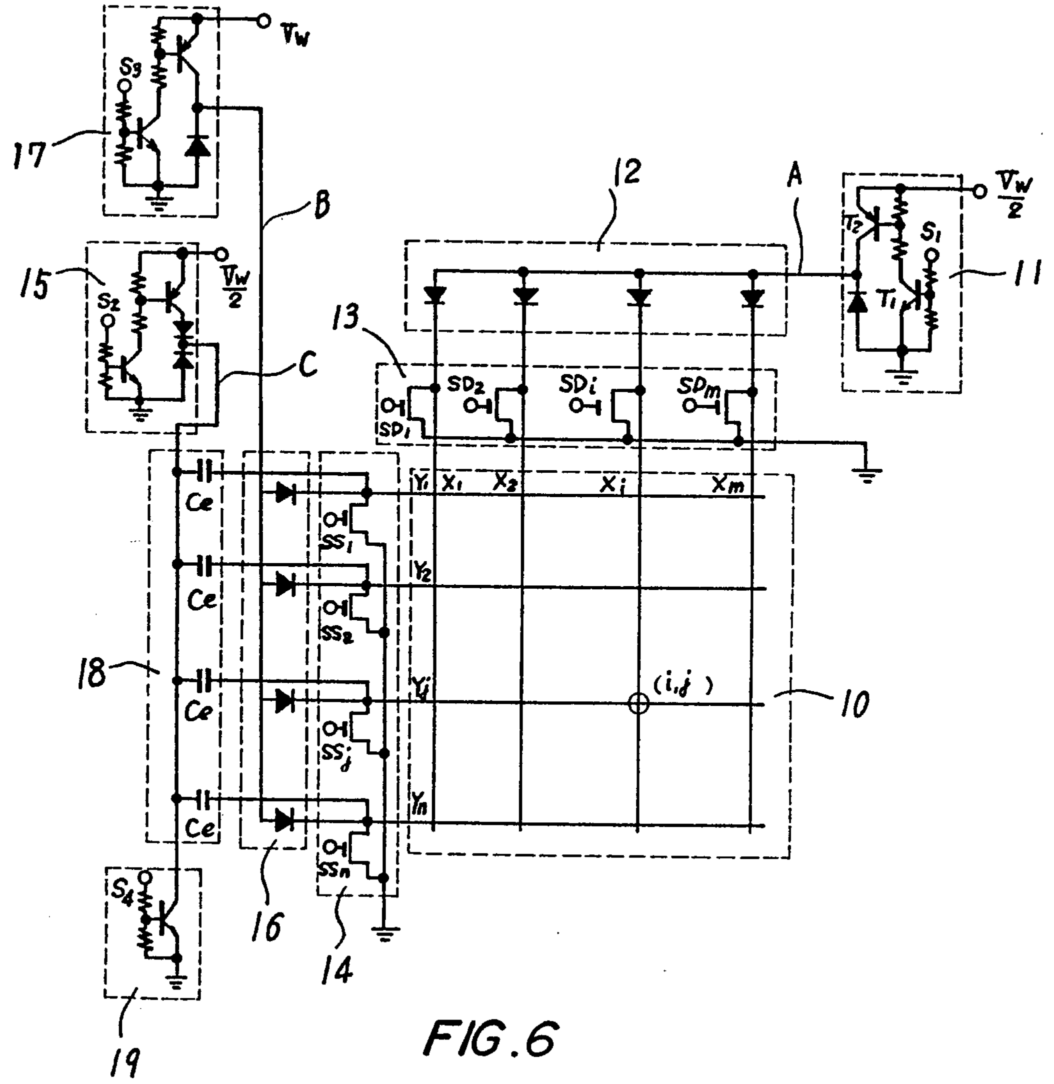
FIG. 6 is a circuit diagram of still another embodiment of a drive system of the present invention.

FIG. 6 shows still another embodiment of the drive system of the present invention, wherein capacitors $C_e$ are interposed between the drive source 15 and each of the scanning lines $Y_1$ through $Y_n$ via a common line C. The array of the capacitors $C_e$ is designated as 18. Like elements corresponding to those of FIG. 2 are indicated by like numerals.

The capacitors $C_e$ are not externally provided. The capacitors $C_e$ are constructed through the use of X-direction electrodes and Y-direction electrodes of the thin-film EL matrix display panel, the electrodes being extended to the edges of the display panel. The common line C is grounded through a transistor circuit 19, which is controlled by ON/OFF signals applied to an input terminal $S_4$ thereof.

Figure 7:
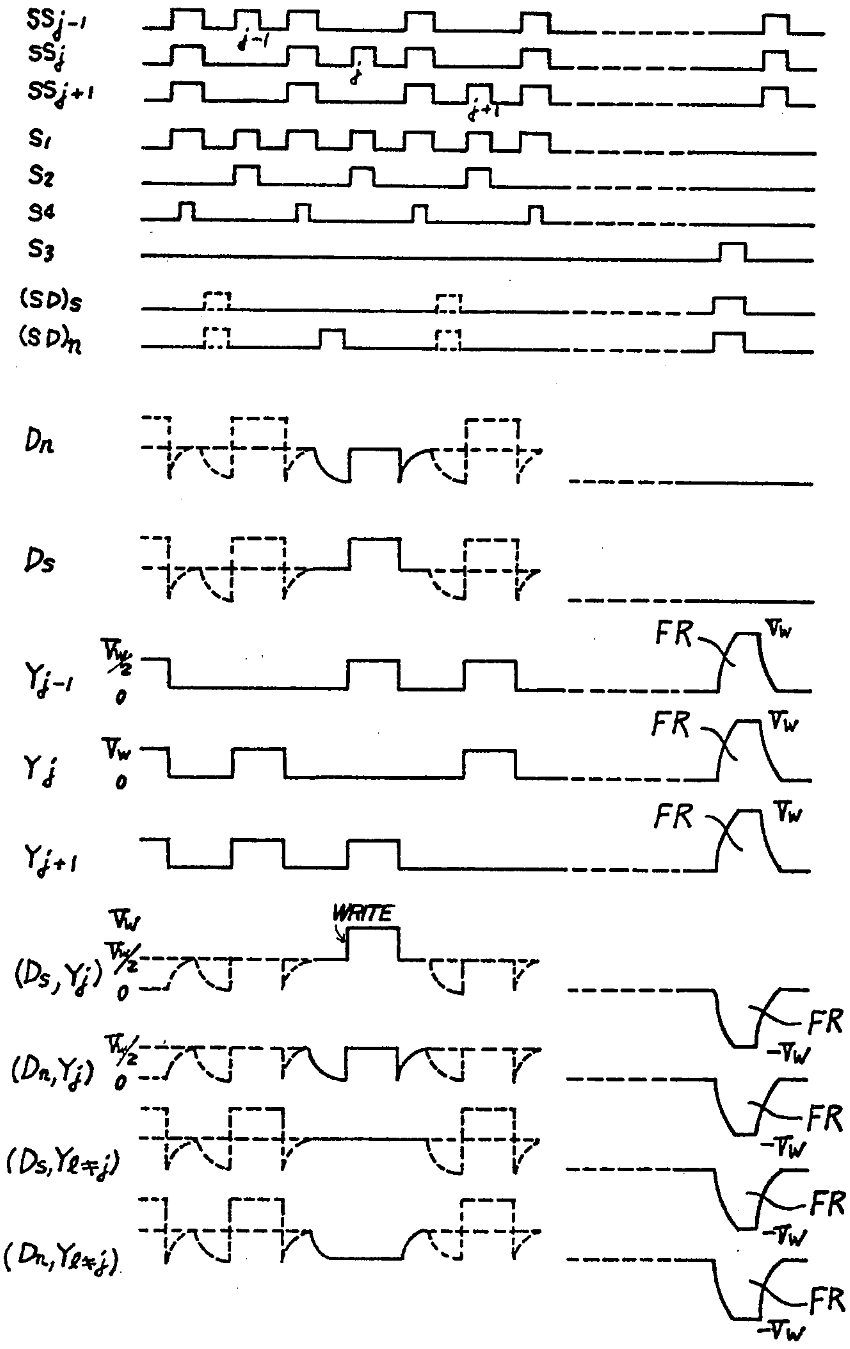
FIG. 7 is a time chart showing various signals occurring within the drive system of FIG. 6.

FIG. 7 is a time chart showing various signals occurring within the drive system of FIG. 6.

In FIG. 7, $SS_{j-l}$ is a waveform of signals applied to the preceding scanning line, $SS_j$ is a waveform of signals applied to the present scanning line, $SS_{j+l}$ is a waveform of signals to be applied to the next scanning line, and $S_1$ through $S_4$ are waveforms of control signals applied to the input terminals $S_1$ through $S_4$. $(SD)_s$ is a waveform of a selected data line, and $(SD)_n$ is a waveform of a non-selected data line. $D_s$ is a waveform of a signal applied to a selected data line when the scanning line $Y_j$ is scanned, and $D_n$ is a waveform of a signal applied to a non-selected data line when the scanning line $Y_j$ is scanned. $Y_{j-l}$ is a waveform of the preceding scanning line, $Y_j$ is a waveform of the instant scanning line, and the $Y_{j+l}$ is a waveform of the next scanning line. $(D_s, Y_j)$ is a voltage waveform applied to a picture point where selected data line $X_i$ and the scanning line $Y_j$ cross each other, $(D_n, Y_j)$ is a voltage waveform applied to a picture point where non-selected data line $X_{k\neq i}$ and the scanning line $Y_j$ cross each other, $(D_s, Y_{l\neq j})$ is a voltage waveform applied to a picture point where selected data line $X_i$ and non-scanning line $Y_{l\neq j}$ cross each other, and $(D_n, Y_{l\neq j})$ is a voltage waveform applied to a picture point where non-selected data line $X_{k\neq i}$ and non-scanning line $Y_{l\neq j}$ cross each other. FR represents the field refresh pulse.

It will be clear from the foregoing description that all the switching elements included within the data side switching circuit 13 and the scanning side switching circuit 14 are N-channel MOS transistors, since the switching elements only function to flow the current from the X-direction electrodes and the Y-direction electrodes to the grounded terminal.

Figure 8:
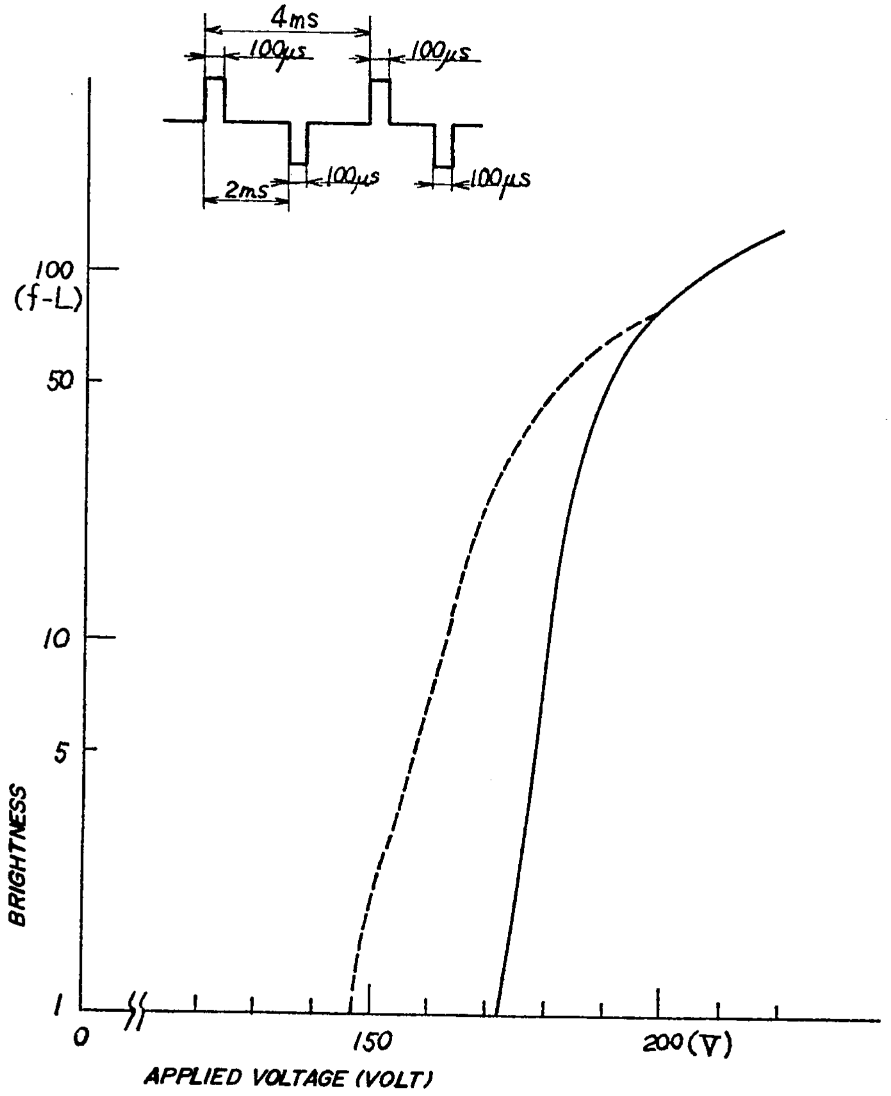
FIG. 8 is a graph showing brightness versus applied voltage characteristics of a thin-film EL element driven by the drive system of the present invention.

FIG. 8 shows brightness versus applied voltage characteristics of a typical thin-film EL element.

FIG. 8 shows the characteristics when the thin-film EL element is driven by an alternating voltage signal of which the frequency is 250 Hz, the pulse width is 100 μsec, and have the positive and negative amplitudes of around 200 V. When the alternating voltage signal is symmetrical, the characteristics are shown by solid line. The dotted line shows a condition when the alternating voltage signal has the fixed amplitude of 200 V in one polarity and has selectable amplitudes below 200 V in the counter polarity.

It will be clear from FIG. 8 that, when the field refresh pulse is fixed at 200 V, the superimposed write-in voltage must be around 200 V, and the voltage applied to the half-selected picture point must be below 140 V.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A drive system for a thin-film EL matrix display panel, said panel including a thin-film EL element sandwiched between a pair of dielectric layers, scanning line electrodes formed on one of said dielectric layers and data line electrodes, transversely disposed of said scanning line electrodes, formed on the other of said dielectric layers, said scanning and data line electrodes defining individual picture points at respective crossings thereof to provide a matrix of picture points and said thin-film EL element having a predetermined threshold voltage level of electroluminescence, said drive system comprising:

first charging means for applying a first selection voltage to said data line electrodes of a magnitude less than said threshold voltage level of electroluminescence;

a plurality of data side switching means connected to each of said data line electrodes on one end and to a ground potential on the other end for switching to a first switched condition and to a second switched condition, said data side switching means selectively maintaining said first selection voltage on desired ones of said data line electrodes when switched to said first switched condition, said data side switching means selectively maintaining said ground potential on the remaining ones of said data line electrodes when switched to said second switched condition;

second charging means for applying a second selection voltage to said scanning line electrodes of a magnitude less than said threshold voltage level of electroluminescence; and a plurality of scanning side switching means connected to each of said scanning line electrodes on one end and to a ground potential on the other end for switching to a first switched condition and to a second switched condition, said scanning side switching means selectively maintaining said second selection voltage on desired ones of said scanning line electrodes when switched to said first switched condition, said scanning side switching means selectively maintaining said ground potential on the remaining ones of said scanning lines electrodes when switched to said second switched condition.

2. The drive system of claim 1, which further comprises a refresh pulse source for applying a refresh pulse to all picture points of said thin-film EL matrix display panel after completion of one field scanning thereof through said scanning side switching means and said data side switching means.

3. The drive system of claim 2, wherein said refresh pulse is applied to said thin-film EL matrix display panel in the counter direction to that of said write-in voltage, and has an amplitude greater than said threshold level of electroluminescence.

4. The drive system of claim 1, wherein said second charging means charges capacitors connected to each of said scanning line electrodes to a voltage level approximately equal to said second selection voltage, said voltage level being below the threshold level of electroluminescence of said EL thin-film layer.

5. A drive system for a thin-film EL matrix display panel in accordance with claim 14 wherein said plurality of data side switching means switches to said first switched condition and said plurality of scanning side switching means switches to said second switched condition during a first stage thereby allowing said data line electrodes to preliminarily charge to a voltage approximately equal to said first selection voltage;

wherein selected ones of said plurality of data side switching means switches to said second switched condition, the remaining one of said plurality of data side switching means remaining in said first switched condition, said plurality of scanning side switching means switching to said first switched condition during a second stage subsequent to said first stage, thereby permitting said voltage on corresponding selected ones of said data line electrodes to discharge to said ground potential and retaining said first selection voltage on the remaining one of said data line electrodes; and wherein a selected one of said plurality of scanning side switching means switches to said second switched condition during a third stage subsequent to said second stage, thereby permitting said second selection voltage associated with the selected scanning side electrode to discharge to said ground potential and permitting said selected one of said data line electrodes to continue to charge to a voltage at least equal to said threshold level of electroluminescence, whereby said picture point at an intersection between the selected scanning line electrode and the selected data line electrode will luminesce.

6. The drive system of claim 5, wherein said scanning side switching means includes a plurality of semiconductor switching elements respectively connected to said scanning line electrodes, and said data side switching means includes a plurality of semiconductor switching elements respectively connected to said data line electrodes.

7. The drive system of claim 6, wherein said semiconductor switching elements included within said scanning side switching means have ON and OFF conditions of actuation and function to force voltage levels of respective ones of said scanning line electrodes connected to said semiconductor switching elements to ground level in their ON conditions, and said semiconductor switching elements included within said data side switching means have ON and OFF conditions of actuation and function to force voltage levels of respective ones of said data line electrodes connected to said semiconductor switching elements to ground level in their ON conditions.

8. The drive system of claim 7, wherein all of said semiconductor switching elements included within said scanning side switching means and said data side switching means are of the same conductivity type.

9. The drive system of claim 7, wherein all of said semiconductor switching elements included within said scanning side switching means and said data side switching means are N-channel MOS transistors.

10. The drive system of claim 6, which further comprises a scanning side diode array including a plurality of diodes respectively connected to said semiconductor switching elements included within said scanning side switching means for separating the respective semiconductor switching elements included within said scanning side switching means, and a data side diode array including a plurality of diodes respectively connected to said semiconductor switching elements included within said data side switching means for separating the respective semiconductor switching elements included within said data side switching means.

11. A drive system for a thin-film EL matrix display panel, said panel including a thin-film EL element sandwiched between a pair of dielectric layers, scanning line electrodes disposed on one of said dielectric layers and data line electrodes, transversely disposed of said scanning line electrodes, disposed on the other of said dielectric layers, said scanning and data line electrodes defining individual picture points at respective crossings thereof to provide a matrix of picture points, said thin-film EL element having a predetermined threshold voltage level of electroluminescence, said drive system comprising:

data side switching means for selectively applying a selection voltage signal of a magnitude less than said threshold voltage level of electroluminescence to desired ones of said data line electrodes;

scanning side switching means for applying a scanning voltage signal of a magnitude less than said threshold voltage level of electroluminescence to each of said scanning line electrodes in a scanning sequence to define selected picture points at the crossings of said data line and scanning line electrodes where said selection voltage signal and scanning voltage signal are respectively applied, the total voltage level at said selected picture points being at least as great as said threshold voltage level of electroluminescence to provide electroluminescence in said thin-film EL element at said selected picture points; and a field refresh pulse source means for applying a field refresh pulse to all picture points of said thin-film EL matrix display panel after completion of field scanning thereof through said scanning side switching means and said data side switching means for allowing said selected picture points to again provide the electroluminescence.

12. A method of driving a thin-film EL matrix display panel, said panel including a thin-film EL element sandwiched between a pair of dielectric layers, scanning line electrodes formed on one of said dielectric layers and data line electrodes transversely disposed of said scanning line electrodes formed on the other of said dielectric layers, said scanning line and data line electrodes defining individual picture points at respective crossings thereof to provide a matrix of picture points, said thin-film EL element having a predetermined threshold voltage level of electroluminescence, said method comprising the steps of:

applying a first selection voltage to each of said data line electrodes, said first selection voltage having a magnitude below the threshold voltage level of electroluminescence;

applying a ground potential to each of said scanning line electrodes substantially simultaneously with the application of said first selection voltage to each of said data line electrodes;

applying a ground potential to selected ones of said data line electrodes; the remaining data line electrode continually being energized by said first selection voltage;

removing the ground potential from each of said scanning line electrodes substantially simultaneously with the application of said ground potential to said selected ones of said data line electrodes and applying a second selection voltage to each of said scanning line electrodes, said second selection voltage having a magnitude below the threshold voltage level of electroluminescence; and removing said ground potential from each of said selected ones of said data line electrodes and applying a ground potential to a selected one of said scanning line electrodes;

whereby said EL element at said picture point defined by the intersection between said selected one of said scanning line electrodes and said remaining data line electrode will luminesce.

* * * * *